United States Patent
Laumann et al.

(10) Patent No.: US 7,513,946 B2
(45) Date of Patent: Apr. 7, 2009

(54) CHROME FREE AND ZINC-POOR, ANTI-CORROSIVE PIGMENT MIXTURE AND METHOD FOR THE PRODUCTION AND USE THEREOF

(75) Inventors: Gisela Laumann, Munster (DE); Ewald Philips, Senden (DE); Andreas Vogt, Munstr (DE)

(73) Assignee: BASF Coatings Aktiengesellschaft, Munster (DE)

( * ) Notice: Subject to any disclaimer, the term of this patent is extended or adjusted under 35 U.S.C. 154(b) by 0 days.

(21) Appl. No.: 11/997,801

(22) PCT Filed: Jul. 26, 2006

(86) PCT No.: PCT/EP2006/007371

§ 371 (c)(1),
(2), (4) Date: Feb. 4, 2008

(87) PCT Pub. No.: WO2007/014683

PCT Pub. Date: Feb. 8, 2007

(65) Prior Publication Data

US 2008/0223256 A1 Sep. 18, 2008

(30) Foreign Application Priority Data

Aug. 4, 2005 (DE) .................. 10 2005 036 630

(51) Int. Cl.
*C09D 5/08* (2006.01)
*C09D 17/00* (2006.01)

(52) U.S. Cl. ................. 106/462; 106/14.05; 106/14.42; 106/14.44; 106/431; 252/389.2; 524/186; 524/436

(58) Field of Classification Search .............. 106/14.05, 106/14.42, 14.44, 431, 462; 252/389.2; 524/186, 524/436

See application file for complete search history.

(56) References Cited

U.S. PATENT DOCUMENTS

| | | | | |
|---|---|---|---|---|
| 4,740,393 A | * | 4/1988 | Cody et al. | 427/388.1 |
| 6,464,899 B1 | * | 10/2002 | Haas et al. | 252/389.1 |
| 6,596,061 B1 | * | 7/2003 | Rentschler | 106/14.05 |
| 6,599,351 B1 | * | 7/2003 | Rentschler et al. | 106/14.12 |
| 6,641,923 B2 | * | 11/2003 | Sadvary et al. | 428/447 |
| 7,297,748 B2 | * | 11/2007 | Trivedi | 525/326.6 |
| 2003/0185990 A1 | * | 10/2003 | Bittner et al. | 427/385.5 |

FOREIGN PATENT DOCUMENTS

| | | | |
|---|---|---|---|
| DE | 19826379 A1 | | 12/1999 |
| DE | 19907287 A1 | | 2/2000 |
| EP | 0296540 A2 | * | 12/1988 |
| WO | WO 02/024344 A | * | 3/2002 |
| WO | WO 03/011984 | * | 2/2003 |
| WO | WO 2006/015756 | * | 2/2006 |

OTHER PUBLICATIONS

International Search Report for PCT/EP2006/007371 dated Mar. 30, 2007.
International Preliminary Report and Written Opinion for PCT/EP2006/007371 (Feb. 26, 2008).

* cited by examiner

*Primary Examiner*—Anthony J Green
(74) *Attorney, Agent, or Firm*—Cantor Colburn LLP

(57) ABSTRACT

Chromium-free, low-zinc, corrosion-inhibiting pigment mixture (A) comprising
(a1) 30% to 60% by weight of at least one calcium hydrogen phosphate pigment,
(a2) 15% to 45% by weight of at least one amorphous, calcium-modified silicon dioxide,
(a3) 5% to 25% by weight of at least one calcium borosilicate pigment, and
(a4) 1% to 15% by weight of at least one zinc salt of an organic nitro compound
with the proviso that the zinc content of (A) does not exceed 10% by weight;
process for preparing it, and its use.

16 Claims, No Drawings

CHROME FREE AND ZINC-POOR, ANTI-CORROSIVE PIGMENT MIXTURE AND METHOD FOR THE PRODUCTION AND USE THEREOF

CROSS REFERENCE TO RELATED APPLICATIONS

This application is a National Phase Application of International Patent Application PCT/EP2006/007371, filed on Jul. 26, 2006, which claims priority to German patent application DE 10 2005 036 630.9, filed on Aug. 4, 2005.

FIELD OF THE INVENTION

The present invention relates to a new, chromium-free, low-zinc, corrosion-inhibiting pigment mixture. The present invention also relates to a new process for preparing a chromium-free, low-zinc, corrosion-inhibiting pigment mixture. The present invention further relates to the use of the new, chromium-free, low-zinc, corrosion-inhibiting pigment mixture and of the chromium-free, low-zinc, corrosion-inhibiting pigment mixture prepared by the new process for preparing new, chromium-free, low-zinc, curable materials, especially priming materials, particularly primers, primer-surfacers, surfacers, and putties. The present invention relates not least to the use of the new, chromium-free, low zinc, curable materials for producing new, chromium-free, low-zinc, corrosion-inhibiting, cured materials, especially prime coats and intermediate coatings.

BACKGROUND

Primer coatings, or primers for short, are the collective designation for thin coats applied directly to a metal substrate in order, within a coating system, to take on a particular function as primers, especially for promoting adhesion and controlling corrosion (cf. Römpp Lexikon Lacke und Druckfarben, Georg Thieme Verlag, Stuttgart, New York, 1998, "primers").

Primer-surfacers, or "surfacing primers", are undercoating materials which combine the properties of primers and surfacers (cf. Römpp Lexikon Lacke und Druckfarben, Georg Thieme Verlag, Stuttgart, New York, 1998, "primer-surfacers").

Priming materials, including the materials for intermediate coatings, are coating materials which are applied directly to a substrate or to an existing coating for refinishing purposes. They include, in particular, primer-surfacers, primers, surfacers, and putties (cf. Römpp Lexikon Lacke und Druckfarben, Georg Thieme Verlag, Stuttgart, New York, 1998, "priming materials").

Surfacers are coating materials for intermediate coating in automotive OEM finishing, automotive refinish, and industrial coating. Their function is to compensate unevennesses in the substrate, assist adhesion and corrosion control (particularly as primer-surfacers), and to ensure effective stonechip resistance in the coating system as a whole or in the multicoat paint system (cf. Römpp Lexikon Lacke und Druckfarben, Georg Thieme Verlag, Stuttgart, New York, 1998, "surfacers", or Goldschmidt/Streitberger, BASF Handbuch Lackiertechnik, Vincentz Verlag, Hannover, 2002, "7.1.4 Surfacers", pages 725 to 728, and "7.2 Automotive refinish", pages 737 to 744).

Putties or filling compounds according to DIN 55945:1996-09 are pigmented, highly filled coating materials which are used for compensating substrate unevennesses which are too great to be remedied by primers or surfacers (cf. Römpp Lexikon Lacke und Druckfarben, Georg Thieme Verlag, Stuttgart, New York, 1998, "putties"; or Goldschmidt/Streitberger, BASF Handbuch Lackiertechnik, Vincentz Verlag, Hannover, 2002, "7.2 Automotive refinish", pages 737 to 744).

The corrosion inhibition effect of the coatings described above derives in particular from the presence therein of anticorrosive pigments (cf. Römpp Lexikon Lacke und Druckfarben, Georg Thieme Verlag, Stuttgart, New York, 1998, "anticorrosive coating material" and "anticorrosive pigments"). A particularly high corrosion control effect is displayed by chromate and/or zinc anticorrosive pigments (cf.op. cit., "chromate pigments", "zinc chromates", "zinc oxide", "zinc phosphate ", and "zinc pigments", and also German patent application DE 100 48 268 A1). These pigments, however, are very objectionable toxicologically, which is why the art sector has endeavored to replace them by other, toxicologically less objectionable or unobjectionable anticorrosive pigments.

Chromium- and zinc-free anticorrosive pigments are conventional.

For instance, the company Heubach GmbH sells unhydrated calcium hydrogen phosphate under the brand name Heucophos® CHP as an anticorrosive pigment for water-thinnable hybrid systems.

The company Lawrence Industries sells calcium borosilicates, particularly Halox® CW-2230, esters, oils, phenolic resins, alkyd/chlorinated rubber, and VT alkyd resins.

The company Grace sells amorphous, calcium-modified silicon dioxide under the brand name Shieldex® AC-3 as a nontoxic anticorrosive pigment for coil-coating primers and 1- or 2-component wash primers.

The company Heubach also sells the zinc salt of an organic nitro compound (zinc content: 44% by weight) under the brand name Heucorin® RZ as a corrosion inhibitor for coatings.

It has been found, however, that none of these anticorrosive pigments and none of the inhibitors has on its own a corrosion control effect sufficient to meet the stringent requirements imposed on the priming materials for automotive refinish. Moreover, the priming materials in question, and the prime coats and intermediate coatings produced from them, leave something to be desired in their substrate adhesion and intercoat adhesion and also in their stonechip protection effect.

SUMMARY

The object on which the present investion was based was to provide a new, chromium-free, low-zinc, corrosion-inhibiting pigment mixture which can be prepared easily from conventional and readily obtainable anticorrosive pigments and which in terms of its corrosion control effect sonstitutes a full-fledged substitute for anticorrosive pigments based on chromium and/or zinc.

The new, chromium-free, low-zinc, corrosion-inhibiting pigment mixture ought to be easily incorporable into curable materials, preferably priming materials, especially primers, primer-surfacers, surfacers, and putties.

The new curable materials, preferably the new priming materials, especially the new primers, primer-surfacers, surfacers, and putties, ought to give new, chromium-free, low-zinc, corrosion-inhibiting, cured materials, especially prime coats and intermediate coatings, which have a corrosion control effect which is at least comparable with, if not indeed exceeding, the corrosion control effect of conventional cured materials containing chromium and/or zinc. At the same time the new, chromium-free, low-zinc, corrosion-inhibiting prime coats and intermediate coatings ought to exhibit a high level of adhesion to a wide variety of substrates, including existing coatings, and a high level of intercoat adhesion, outstanding mechanical properties, and a particularly high stonechip protection effect, and ought to compensate even marked unevennesses on substrates to outstanding effect.

Found accordingly has been the new, chromium-free, low-zinc, corrosion-inhibiting pigment mixture (A) comprising
(a1) 30% to 60% by weight of at least one calcium hydrogen phosphate pigment,
(a2) 15% to 45% by weight of at least one amorphous, calcium-modified silicon dioxide,
(a3) 5% to 25% by weight of at least one calcium borosilicate pigment, and
(a4) 1% to 15% by weight of at least one zinc salt of an organic nitro compound
with the proviso that the zinc content of (A) does not exceed 10% by weight, this mixture being referred to below as "pigment mixture (A) of the invention".

Also found has been the new process for preparing a pigment mixture (A) of the invention, which involves mixing its constituents with one another to give a separate pigment mixture (A) of the invention, or mixing its constituents (a1), (a2), (a3), and (a4) with other substances, to give a pigment mixture (A) of the invention in situ.

The new process for preparing a pigment mixture (A) of the invention is referred to below as "process of the invention".

Additionally found has been the new use of the pigment mixture (A) of the invention and of the pigment mixture (A) of the invention prepared by the process of the invention for preparing curable materials, this being referred to below as "use in accordance with the invention".

Further subject matter of the invention will become apparent from the description.

DETAILED DESCRIPTION

In the light of the prior art it was surprising and unforeseeable for the skilled worker that the object on which the present invention was based could be achieved by means of the pigment mixture (A) of the invention, by means of the process of the invention, and by means of the use in accordance with the invention.

In particular it was surprising that the pigment mixture (A) of the invention was easily prepared, in particular by the process of the invention, from conventional and readily obtainable anticorrosive pigments and in terms of its corrosion control effect offered a full-fledged substitute for anticorrosive pigments based on chromium and/or zinc.

The pigment mixture (A) of the invention was easily incorporable into curable materials, preferably priming materials, especially primers, primer-surfacers, surfacers, and putties.

The resulting curable materials of the invention, preferably the priming materials of the invention, especially the primers, primer-surfacers, surfacers, and putties of the invention, were easy to handle and to apply.

The curable materials of the invention were able to be cured by a wide variety of mechanisms and consequently had an extraordinarily broad use from this. In particular they display particular advantages in the context of their use in refinish coating, especially automotive refinish.

The curable materials of the invention gave new, chromium-free, low-zinc, corrosion-inhibiting, cured materials, especially new prime coats and intermediate coatings, which had a corrosion control effect that was at least comparable with, if not indeed exceeding, the corrosion control effect of conventional cured materials containing chromium and/or zinc. At the same time the prime coats and intermediate coatings of the invention had a high level of adhesion to a wide variety of substrates, including existing coatings, and a high level of intercoat adhesion, outstanding mechanical properties, and a particularly high stonechip protection effect, and were able to compensate even marked unevennesses on substrates to outstanding effect.

In particular, however, it was surprising that the pigment mixture (A) of the invention displayed its advantageous effects in the cured materials of the invention even in a comparatively small amount.

The pigment mixture (A) of the invention is chromium-free. In other words, if it contains chromium at all, it is only present in traces entrained, for example, owing to the possible natural presence of traces of chromium in the constituents. The chromium content is preferably below the detection limits of conventional chemical and physical methods of detecting and quantifying chromium.

The pigment mixture (A) of the invention is a low-zinc mixture. In other words, its zinc content does not exceed 10%, preferably 7%, and in particular 5% by weight.

The pigment mixture (A) of the invention is composed of
(a1) 30% to 60%, preferably 35% to 55%, and in particular 40% to 50% by weight of at least one, especially one, calcium hydrogen phosphate pigment,
(a2) 15% to 45%, preferably 20% to 40%, and in particular 25% to 35% by weight of at least one, especially one, amorphous, calcium-modified silicon dioxide,
(a3) 5% to 25%, preferably 7% to 22%, and in particular 10% to 20% by weight of at least one, especially one, calcium borosilicate pigment, and
(a4) 1% to 15%, preferably 2% to 12%, and in particular 3% to 10% by weight of at least one, especially one, zinc salt of an organic nitro compound.

The calcium hydrogen phosphate pigment (a1) preferably has a calcium content (as calcium oxide) of 38% to 43%, preferably 38.5% to 42.5%, by weight, and a phosphorus content (as diphosphorus pentoxide) of 43% to 48%, preferably 43.5% to 47.5%, by weight. The average particle size, determined using a Coulter Multisizer II, is preferably 1 to 10 µm, preferably 1.5 to 5 µm, and particularly 2.5 to 4 µm. The sieve residue to DIN 53195 (>32 µm) is preferably below 0.01% by weight.

Calcium hydrogen phosphate pigments (a1 are conventional products and are sold for example by the company Heubach under the brand name Heucophos® CHP.

The amorphous, calcium-modified silicon dioxide (a2) preferably has a calcium content of 4% to 8%, more preferably 4.5% to 7.5%, and in particular 5% to 7% by weight. The average particle size, determined using a Coulter Counter, 50 µm nozzle aperture, is preferably 1 to 10 µm, preferably 1.5 to 5 µm, and particularly 2 to 4 µm. The wet sieve residue (>25 µm) is preferably below 0.01% by weight.

The amorphous, calcium-modified silicon dioxides (a2) are conventional products and are sold for example by the company Grace under the brand name Shieldex® AC-3.

The calcium borosilicate pigment (a3) preferably has a calcium oxide content of 43% to 44% by weight, a diboron trioxide content of 17% to 18% by weight, and a silicon dioxide content of 38% to 39.5% by weight. It preferably has the above-described particle sizes.

The calcium borosilicate pigments (a3) are conventional products and are sold for example by the company Lawrence Industries under the brand name Halox® CW-2230.

The zinc salt of an organic nitro compound (a4) preferably has a zinc content of 40% to 50%, more preferably 43% to 45%, by weight. It preferably has the above-described particle sizes. The sieve residue (>45 μm) to ISO 787, part 18, is preferably below 0.02% by weight.

The zinc salts of organic nitro compounds (a4) are likewise conventional products and are sold for example by the company Heubach under the brand name Heucorin® RZ.

The pigment mixture (A) of the invention can be prepared in any desired way. Preferably it is prepared by the process of the invention.

In the process of the invention the above-described constituents (a1), (a2), (a3), and (a4), preferably in the form of pulverulent solids, are mixed with one another, for which the conventional powder mixers can be used. This embodiment of the process of the invention produces pigment mixtures (A) of the invention as separate products, which can be stored and transported without special precautionary measures up until the time of their use as intended; this represents a further particular advantage of the pigment mixtures (A) of the invention.

In the process of the invention, however, it is also possible to mix the above-described constituents (a1), (a2), (a3), and (a4), preferably in the form of pulverulent solids, with other substances, preferably constituents of curable materials of the invention, after which the resulting mixtures are homogenized. This can be done by means of conventional mixing methods and apparatus such as stirred tanks, agitator mills, extruders, compounders, Ultraturrax devices, inline dissolvers, static mixers, micromixers, toothed-wheel dispersers, pressure release nozzles and/or microfluidizers. This embodiment of the process of the invention produces in situ the pigment mixtures (A) of the invention, preferably in pigment pastes or pigment preparations of the invention (cf. Römpp Lexikon Lacke und Druckfarben, Georg Thieme Verlag, Stuttgart, New York, 1998, "pigment preparations") or in the curable materials of the invention.

It is a further particular advantage of the pigment mixtures (A) of the invention, indeed, that even in the form of the pigment pastes of the invention they can be processed with particular ease and very good reproducibility into the curable materials of the invention.

The pigment mixtures (A) of the invention can be used extraordinarily broadly; they are used with preference, in accordance with the invention, for preparing curable materials.

It is a very particular advantage of the pigment mixtures (A) of the invention that they display their advantageous effects in comparatively small amounts. For instance, the amount of the pigment mixtures (A) of the invention in the curable materials of the invention is preferably 1% to 50%, more preferably 1% to 40%, and in particular 1% to 25% by weight.

The zinc content of the curable materials of the invention, based in each case on the material of the invention, is preferably 0.002% to 3%, more preferably 0.003% to 2%, and in particular 0.004% to 1.5% by weight.

The curable materials of the invention may be curable physically, thermally and/or with actinic radiation.

In the context of the present invention the term "physical curing" denotes the curing of the curable materials of the invention by filming, by release of solvent from the curable materials of the invention, with linking taking place within the curable materials of the invention via looping of the polymer molecules of the binders (regarding the term, cf. Römpp Lexikon Lacke und Druckfarben, Georg Thieme Verlag, Stuttgart, New York, 1998, "binders", pages 73 and 74). Or else filming takes place via the coalescence of binder particles (cf. Römpp Lexikon Lacke und Druckfarben, Georg Thieme Verlag, Stuttgart, New York, 1998, "curing", pages 274 and 275). This results in thermoplastic, cured materials of the invention.

In the context of the present invention the term "thermal curing" denotes the heat-initiated curing of the curable material of the invention, in the course of which, usually, a binder and a separate crosslinking agent are employed. This is normally referred to by those in the art as external crosslinking. Where the crosslinking agents are already incorporated in the binders, the term "self-crosslinking" is also used (cf. Römpp Lexikon Lacke und Druckfarben, Georg Thieme Verlag, Stuttgart, New York, 1998, "curing", pages 274 to 276, especially page 275, bottom). This results in thermoset cured materials of the invention.

In the context of the present invention actinic radiation means electromagnetic radiation, such as near infrared (NIR), visible light, UV radiation, x-rays or gamma radiation, especially UV radiation, and particulate or corpuscular radiation, such as electron beams, beta radiation, alpha radiation, neutron beams or proton beams, especially electron beams. The corresponding curable materials of the invention hence include constituents which can be activated with actinic radiation, as a result of which they undergo free-radical or ionic, especially free-radical, polymerization. As a consequence of this there is a three-dimensional crosslinking of the curable materials of the invention. This results in thermoset cured materials of the invention.

The curable materials of the invention may cure by one curing mechanism or by two or all three curing mechanisms. In particular they are thermally curable.

The curable materials of the invention may be present in any of a very wide variety of physical states and three-dimensional forms.

For instance, they may at room temperature be solid or liquid or fluid. Alternatively they may be solid at room temperature and fluid at higher temperatures, in which case they preferably display thermoplastic behavior. In particular they may be conventional materials comprising organic solvents, aqueous materials, substantially or entirely solvent-free and water-free liquid materials (100% systems), substantially or entirely solvent-free and water-free solid powders, or substantially or entirely solvent-free powder suspensions (powder slurries). They may also be one-component systems, in which the binders and crosslinking agents are present alongside one another, or two-component or multicomponent systems, in which the binders and the crosslinking agents are separate from one another until shortly before application.

In terms of its method the preparation of the curable materials of the invention has no special features but instead takes place by the mixing and homogenizing of their constituents with the aid of conventional mixing techniques and apparatus, such as stirred tanks, agitator mills, extruders, compounders, Ultraturrax devices, inline dissolvers, static mixers, micromixers, toothed-wheel dispersers, pressure release nozzles and/or microfluidizers, with actinic radiation being excluded where appropriate. The selection of the optimum method for a specific case is guided in particular by the physical state (liquid or solid) and the three-dimensional form (powder, granules or film) which the curable material of the invention is supposed to have.

The curable materials of the invention may serve any of a very wide variety of end uses. They are preferably used for producing the cured materials of the invention.

The curable materials of the invention are preferably priming materials, more preferably primers, primer-surfacers, surfacers, and putties, and with particular preference primer-surfacers. Preferably they are used in refinish coating, especially automotive refinish. Accordingly, the particularly advantageous cured materials of the invention are surfacer coats or primer-surfacer coats.

The priming materials of the invention are preferably liquid one-component or two-component systems which contain organic solvents. These systems comprise, as is known, at least one component I, containing reactive functional groups, and at least one component II, containing complementary reactive functional groups, the two kinds of complementary reactive functional groups having the ability to react with one another so fast that the components I and II in question have to be stored separately from one another up until the time of their appropriate use, i.e., the preparation of the curable materials of the invention. Complementary reactive functional groups of this kind are conventional and may therefore very easily be selected by the skilled worker on the basis of his or her general art knowledge.

The curable materials of the invention are preferably liquid two-component systems containing organic solvents and comprising with particular preference a component I which is free from isocyanate groups and which contains isocyanate-reactive functional groups, and which is also referred to by those in the art as "millbase I", and a component II containing at least one polyisocyanate, also referred to by those in the art as "curing agent". Components I and II are stored separately from one another up until the time of their use as intended.

Examples of suitable isocyanate-reactive functional groups are hydroxyl groups, thiol groups, and primary and secondary amino groups, especially hydroxyl groups.

The two-component systems of the invention may further comprise at least one further component II, such as a diluent, for example, which is usually a mixture of the inert organic solvents described below.

The pigment mixture (A) of the invention is preferably present in the millbase I, which is referred to below as "millbase I of the invention".

The millbases I of the invention comprise at least one inert organic solvent. Examples of suitable solvents are known from the textbook Paints, Coatings and Solvents, Dieter Stoye and Werner Freitag (eds.), Wiley-VCH, Weinheim, New York, 1998, "14. Solvents", pages 277 to 373. The attribute "inert" means that the organic solvent in question does not participate in the reactions which proceed in the course of thermal curing but instead escapes predominantly or completely from the cured materials of the invention which form.

As mentioned above, the inert organic solvents may be used for preparing the diluent III.

Further to the inert organic solvents, the millbases I of the invention may comprise at least one reactive solvent or reactive diluent which participates in the reactions which proceed in the course of thermal curing and is incorporated into the three-dimensional network that forms of the cured materials of the invention (cf., for example, German patent application DE 100 12 580 A1, page 9, lines 54 and 55).

The amount of the organic solvents in the millbases I of the invention may vary very widely and is guided in particular by the viscosity that the millbases I of the invention and the priming materials of the invention produced from them need to have for their handling and application. The amount is preferably 5% to 60%, more preferably 10% to 55%, and in particular 10% to 50% by weight, based in each case on the millbase I of the invention.

The millbases I of the invention comprise at least one polymeric and/or oligomeric binder. Preferably they comprise at least two, in particular three, polymeric and/or oligomeric binders.

In the context of the present invention an oligomer is a compound constructed from 2 to 12 monomeric structural units, which may be identical to or different from one another. A polymer is a compound constructed from more than 8, in particular more than 12, monomeric structural units, which may be identical to or different from one another.

Whether a compound constructed from 8 to 12 monomeric structural units is regarded in any one case by the skilled worker as being an oligomer or a polymer depends in particular on the molecular weight of the compound in question.

Suitable binders include all customary, known binders, such as are known, for example, from Römpp Lexikon Lacke und Druckfarben, Georg Thieme Verlag, Stuttgart, New York, "binders". Preference is given to using epoxy resins (cf., for example, German patent application DE 100 48 268 A1, page 5, paragraphs [0057] and [0058]), (meth)acrylate (co)polymers (cf., for example, German patent application DE 100 12 580 A1, page 5, line 33, to page 7, line 34) and/or nitrocellulose or cellulose nitrate (cf. Römpp Lexikon Lacke und Druckfarben, Georg Thieme Verlag, Stuttgart, New York, 1998 "cellulose nitrate").

The binder content of the millbases I of the invention may vary very widely and is guided by the requirements of the case in hand. The amount is preferably 10% to 60%, more preferably 15% to 50%, and in particular 20% to 40% by weight, based in each case on the priming material.

The millbases I of the invention preferably further comprise at least one filler, such as is known, for example, from German patent application DE 100 48 268 A1, page 4, paragraphs [0040] and [0041], or from German patent application DE 100 12 580 A1, page 9, lines 39 to 42.

The millbases I of the invention preferably additionally comprise at least one pigment different than the constituents of the pigment mixture (A) of the invention, said pigment being of the kind known, for example, from German patent application DE 100 48 268 A1, page 4, paragraphs [0042] and [0043].

The millbases I of the invention may further comprise at least one customary, known additive, such as is known, for example, from German patent application DE 100 48 268 A1, page 4, paragraphs [0044] and [0045], or from German patent application DE 100 12 580 A1, page 9, line 62, to page 10, line 20, in effective amounts.

The hardeners II of the two-component systems of the invention comprise or consist of at least one polyisocyanate. If the hardeners II consist of at least one polyisocyanate, said polyisocyanate is preferably liquid at the temperatures employed for the preparation and use of the hardeners II, and particularly at room temperature. More preferably the hardeners II consist of at least one polyisocyanate and at least one of the above-described inert organic solvents. The amount of polyisocyanates in the hardeners II may vary widely. It is guided primarily by the viscosity the hardeners II are to have for their application. This viscosity is preferably low, so that the hardeners II can be mixed homogeneously with the millbases I of the invention without complex apparatus and without expending high levels of time and energy—and, in particular, in the case of small volumes, by hand. The amount of polyisocyanates in the hardeners II, based in each case on the hardener II, is preferably 30% to 95%, more preferably 40% to 90%, and in particular 50% to 90% by weight.

Examples of suitable polyisocyanates are described in detail in German patent application DE 100 48 670 A1, page 5, paragraph [0059], to page 6, paragraphs [0062]. Particular preference is given to using polyisocyanates of low viscosity containing uretdione groups and/or iminooxadiazinedione groups.

With regard to the preparation of the preferred priming materials of the invention, the weight ratio of millbase I of the invention and hardener II may vary very widely. The weight ratio is preferably set such that the equivalent ratio of isocyanate-reactive functional groups to isocyanate groups is 1.5:1 to 1:1.5, preferably 1.3:1 to 1:1.3, and in particular 1.2:1 to 1:1.2.

In terms of method, the preparation of the preferred priming materials of the invention from the above-described two-component systems of the invention has no peculiarities but instead takes place by the mixing of at least one millbase I of the invention with at least one hardener II and also, if desired, with at least one further component III, in particular a diluent III, and the homogenizing of the resultant mixture. The sequence in which components I and II and, where used, III are combined is not critical but may instead be adapted to the requirements of the case in hand. For the preparation it is possible to use the techniques and apparatus described above.

Surprisingly, the preferred priming materials of the invention combine a particularly high reactivity, leading to rapid curing, with a particularly long pot life or processing time, in tune with practical requirements, which makes their application particularly attractive not only from a technical standpoint but also from an economic and organizational standpoint.

In terms of method, the application of the preferred priming materials of the invention has no peculiarities but may instead take place by all of the usual application methods, such as spraying, knifecoating, brushing, pouring, dipping, trickling or rolling, for example.

Preference is given to employing spray application methods, such as compressed-air spraying, airless spraying, high-speed rotation, electrostatic spray application (ESTA), alone or in conjunction with hot spray application such as hot-air hot spraying, for example.

Suitable substrates include metals, plastics, wood, ceramic, stone, textile, fiber composites, leather, glass, glass fibers, glass wool, rock wool, mineral- and resin-bound building materials, such as plasterboard and cement slabs or roof shingles, and also composites of these materials. In the context of use in accordance with the invention for refinishing, especially automotive refinish, the substrates comprise an existing coating (cf. Römpp Lexikon Lacke und Druckfarben, Georg Thieme Verlag, Stuttgart, New York, 1998, "existing coating").

The preferred priming materials of the invention are also suitable in principle for applications outside of refinishing, especially automotive refinish. In such cases they are particularly suitable for the coating of furniture, windows, doors, the interior and exterior of built structures, and industrial coating, including coil coating, container coating, and the impregnation or coating of electrical components. Within the context of industrial coatings they are suitable for coating virtually all parts for domestic or industrial use, such as radiators, household appliances, small metal parts such as nuts and bolts, hubcaps, wheel rims, packaging or electrical components such as motor windings or transformer windings.

Where the preferred priming materials of the invention are used for automotive refinish, the substrates have been coated with an existing coating or original finish.

The preferred priming materials of the invention, once applied, exhibit an especially advantageous drying and curing behavior. For instance, they can be dried in a particularly gentle procedure at room temperature for 15 minutes to 2 days. Alternatively, they can be dried at 60° C. for 10 minutes to 4 hours, in particular 30 minutes to 4 hours.

The applied preferred priming materials of the invention, particularly the surfacers or primer-surfacers of the invention, are coated wet-on-wet, in the case of automotive refinish, with a customary, known pigmented two-component topcoat material, preferably after brief flash-off for 1 to 15 minutes, and then the surfacer film or primer-surfacer film of the invention and the topcoat film are dried together at room temperature or at temperatures up to 90° C., in a forced-air oven, for example, or, in the case of smaller areas, using a hairdryer or an infrared lamp. Alternatively, the surfacer film or primer-surfacer film of the invention can be overcoated, wet-on-wet if desired, with a customary, known basecoat material and with a customary, known clearcoat material. Subsequently the films which have not yet been cured can be cured.

In general the priming materials of the invention are applied in a wet film thickness such that curing thereof results in surfacer coatings or primer-surfacer coatings of the invention which have the film thicknesses that are necessary and advantageous for their functions. The film thicknesses are preferably 20 to 200, more preferably 25 to 180, very preferably 30 to 150, and in particular 35 to 120 µm.

In addition to the above-described advantages of the cured materials of the invention, the surfacer coatings and primer-surfacer coatings of the invention exhibit particularly good polishability and overcoatability.

INVENTIVE AND COMPARATIVE EXAMPLES

Inventive Example 1

The Preparation of the Chromium-Free, Low-Zinc, Corrosion-Inhibiting Primer-Surfacer 1

The primer-surfacer was prepared by mixing the following constituents and homogenizing the resulting mixture:

14% by weight of a 60 percent strength solution of an epoxy resin (Epikote® 1001 from Resolution or Hexion) in xylene/butyl acetate, 12% by weight of the solution of a hydroxyl-containing polyacrylate (Macrynal® SM515 3 from Cytec), 10% by weight of calcium hydrogen phosphate pigment (a1) (Heucophos® CHP from Heubach), 6.4% by weight of amorphous, calcium-modified silica (a2) (Shieldex® AC-3 from Grace), 3.5% by weight of calcium borosilicate pigment (a3) (Halox® CW2230 from Lawrence Industries), 1.5% by weight of a zinc salt of an organic nitro compound (a4) (Heucorin® RZ from Heubach), 2% by weight of amorphous pyrogenic silica (Aerosil® R972 from Degussa), 11% by weight of titanium dioxide pigment (TI-PURE® R960 from Du Pont), 1% by weight of commercially customary tinting pigments, 10% by weight of barium sulfate (Blanc fixe® N from Sachtleben), 10% by weight of talc (Luzenac® 10M0 from Talc de Luzenac), 4% by weight of nitrocellulose cotton (NC Wolle LSG from wolff cellulosics, 30 percent strength in butyl acetate), 1% by weight of an additive mixture (flow-control agent, catalyst, and adhesion promoter), and 13.6% by weight of solvent mixture based on xylene/butyl acetate.

The resulting millbase I was free from chromium and had a zinc content of 0.66% by weight. It was stable on storage and easy to process.

40 parts by volume of the millbase I were mixed with 10 parts by volume of a diluent III based on xylene and butyl acetate and with 10 parts by volume of a 50 percent strength polyisocyanate solution II (polyisocyanate containing iminooxadiazinedione groups, Desmodur® XP2410 from Bayer Aktiengesellschaft, in xylene/butyl acetate). The resulting mixture was subsequently homogenized.

The priming material had a pot life of several hours, which was in tune with practical requirements, and went on very well. It was chromium-free and had a zinc content of well below 0.66% by weight.

Comparative Example C1

The Preparation of the Chromium-Containing, Zinc-Rich, Corrosion-Inhibiting Primer-Surfacer C1

Inventive example 1 was repeated but using, in place of constituents (a1), (a2), (a3) and (a4), 16.5% by weight of zinc phosphate with a zinc content of 55% to 57% by weight and a chromium content of 0.15% by weight (Heucophos® ZPZ from Heubach). The zinc content of the resulting primer-surfacer was 9.2% by weight.

Inventive Example 2 and Comparative Example C2

The Production of the Chromium-Free, Low-Zinc Primer-Surfacer Coating 2 and of the Chromium- and Zinc-Containing Primer-Surfacer Coating C2

Inventive Example 2

Primer-surfacer 1 from inventive example 1 was applied to test panels of aluminum, iron, and galvanized steel, then flashed off for an hour and dried, and then overcoated with a commercially customary two-component topcoat material from the 22 Line from BASF Coatings AG, after which the two films were dried together in air at room temperature for 12 hours or in a forced-air oven at 60° C. for 30 minutes.

This gave the primer-surfacer coating 2 with a film thickness of 80 μm, and a topcoat with a film thickness of 60 μm.

Comparative Example C2

Inventive example 2 was repeated but using the primer-surfacer C1 from comparative example C1 instead of primer-surfacer 1 from inventive example 1, and adjusting the wet film thicknesses such that the primer-surfacer coating C2 had a film thickness of 95 μm and the topcoats had a film thickness of 50 μm.

The table compares the important performance properties of the multicoat paint systems of inventive example 2, comprising primer-surfacer coating 2, and of comparative example C2, comprising primer-surfacer coating C2. The multicoat paint system C2 of comparative example C2 is used as reference, and for the comparison it is specified whether the multicoat paint system 2 of inventive example 2 deviates from the reference not at all or not significantly (rating 0), in the manner of a significant improvement (rating +), in the manner of a particularly great improvement (rating ++), or in the manner of a significant deterioration (rating –).

TABLE

Comparison of the performance properties of the multicoat paint systems of inventive example 2 and of comparative example C2 (reference)

| Test method | Inventive example 2 Substrates: | | |
|---|---|---|---|
| | Al | Fe | Zn[a] |
| Topcoat holdout | | | |
| Rating: | 0 | 0 | 0 |
| Scratch test (cable knife): | | | |
| Rating: | 0 | 0 | 0 |
| Crosshatch test | | | |
| Rating: | 0 | 0 | 0 |
| Water spray test (WS) (Modified from DIN 50907, section 3.1): | | | |
| 1st evaluation: | 0 | 0 | 0 |
| 4th evaluation: | 0 | 0 | 0 |
| A/C 1 h after exposure: | 0 | 0 | + |
| Condensation test (CC) (DIN50017KK): | | | |
| 1st evaluation: | 0 | 0 | 0 |
| 3rd evaluation: | 0 | 0 | 0 |
| A/C 1 h after exposure: | 0 | 0 | 0 |
| A/C 24 h after exposure: | 0 | 0 | 0 |
| Salt spray test (SS) 480 h (DIN 50021SS) | | | |
| Visible subfilm corrosion: | nt | + | + |
| Scratched subfilm corrosion: | nt | ++ | 0 |
| A/C 1 h after exposure: | nt | 0 | 0 |
| A/C 24 h after exposure: | nt | 0 | 0 |
| Salt spray test (ESS) 480 h (DIN 50021ESS) | | | |
| Visible subfilm corrosion: | 0 | nt | nt |
| Scratched subfilm corrosion: | 0 | nt | nt |
| A/C 1 h after exposure: | 0 | nt | nt |
| A/C 24 h after exposure: | 0 | nt | nt |
| Climate cycling test (CCT): 5 rounds (VDA 621-415) | | | |
| Visible subfilm corrosion: | – | 0 | 0 |
| Scratched subfilm corrosion: | – | 0 | 0 |
| A/C 1 h after exposure: | 0 | 0 | 0 |
| A/C 24 h after exposure: | 0 | 0 | 0 |

A/C = Adhesion and cohesion
[a] = galvanized steel
nt = not tested

The results compiled in the table underline the outstanding corrosion control effect of the primer-surfacer coatings of inventive example 2 on a variety of substrates, with the other important performance properties being very largely retained.

What is claimed is:

1. A chromium-free, low-zinc, corrosion-inhibiting pigment mixture (A) comprising
   (a1) 30% to 60% by weight of at least one calcium hydrogen phosphate pigment,
   (a2) 15% to 45% by weight of at least one amorphous, calcium-modified silicon dioxide,
   (a3) 5% to 25% by weight of at least one calcium borosilicate pigment, and
   (a4) 1% to 15% by weight of at least one zinc salt of an organic nitro compound
   with the proviso that the zinc content of (A) does not exceed 10% by weight.

2. The pigment mixture (A) of claim 1, comprising 35% to 55% by weight of (a1).

3. The pigment mixture (A) of claim 1, comprising 20% to 40% by weight of (a2).

4. The pigment mixture (A) of claim 1, comprising 10% to 20% by weight of (a3).

5. The pigment mixture (A) of claim 1 comprising 3% to 12% by weight of (a4).

6. The pigment mixture (A) of claim 1, its zinc content not exceeding 7% by weight.

7. A process for preparing the chromium-free, low-zinc, corrosion-inhibiting pigment mixture (A) of claim 1, comprising mixing its constituents (a1), (a2), (a3), and (a4) with one another to give a separate pigment mixture (A), or mixing its constituents (a1), (a2), (a3), and (a4) with other substances, to give a pigment mixture (A) in situ.

8. Curable materials comprising the chromium-free, low-zinc, corrosion-inhibiting pigment mixture (A) of claim 1.

9. The curable materials of claim 8, curable physically, thermally, with actinic radiation, or a combination thereof.

10. The curable materials of claim 8, wherein the curable materials are priming materials.

11. The curable materials of claim 10, wherein the priming materials are at least one of primers, primer-surfacers, surfacers, or putties.

12. The curable materials of claim 8, wherein the curable materials are two-component systems or multicomponent systems.

13. The curable materials of claim 12, wherein the two-component systems or multicomponent systems comprise
   (I) at least one component comprising isocyanate-reactive functional groups, and
   (II) at least one component comprising at least one polyisocyanate.

14. Cured materials produced by curing the curable materials of claim 8.

15. The cured materials of claim 14, wherein the cured materials are prime coats or intermediate coatings.

16. The curable materials of claim 8, used in automotive refinish.

* * * * *